United States Patent [19]

Ferrero et al.

[11] Patent Number: 4,490,406

[45] Date of Patent: Dec. 25, 1984

[54] PROCESS FOR OBTAINING LIGHT AND CRISPY SOYBEAN PROTEINS OF AGREEABLE TASTE AND PRODUCT THUS OBTAINED

[76] Inventors: Aldo Ferrero; Mauro Ferrero, both of Via Ampère 9, both of Milan, Italy

[21] Appl. No.: 541,413

[22] Filed: Oct. 13, 1983

[30] Foreign Application Priority Data

Nov. 3, 1982 [IT] Italy ........................... 24040 A/82

[51] Int. Cl.³ ........................... A23L 1/20; A23B 4/04
[52] U.S. Cl. ........................... 426/634; 426/445; 426/448
[58] Field of Search ............... 426/445, 447, 448, 449, 426/459, 460, 634

[56] References Cited

U.S. PATENT DOCUMENTS

| | | | |
|---|---|---|---|
| 2,267,747 | 12/1941 | Plews | 426/634 |
| 2,489,267 | 11/1949 | Chapin et al. | 426/447 |
| 3,268,335 | 8/1966 | Circle et al. | 426/634 |
| 3,865,956 | 2/1975 | Fukushima et al. | 426/634 |
| 3,904,775 | 9/1975 | Harwood et al. | 426/447 |
| 4,044,157 | 8/1977 | Wilding | 426/448 |

FOREIGN PATENT DOCUMENTS 0700002 12/1964 Canada ........................... 426/447

*Primary Examiner*—Raymond Jones
*Assistant Examiner*—Marianne Minnick
*Attorney, Agent, or Firm*—Oblon, Fisher, Spivak, McClelland & Maier

[57] ABSTRACT

A process for obtaining soybean protein flakes, granules, or powder, suitable for the direct human consumption, easily digestible and which do not lead, when eaten, to flatulence, consisting of subjecting, through a puffing process, to a further cooking and consequent expansion - lightening the granules of soybean proteins formerly extruded, that is already heat-treated and expanded. The obtained product may be further heat-treated for a period from 30 minutes to 10 hours, but preferably from one and two hours for obtaining flakes, granules or powder of soybean proteins light, agreeable to eat as such and easily digestible.

The flakes, granules or powder of soybean proteins may be mixed to soy lecithin paste or an edible oil, in a dosage varying from 2% to 40% by weight.

13 Claims, No Drawings

PROCESS FOR OBTAINING LIGHT AND CRISPY SOYBEAN PROTEINS OF AGREEABLE TASTE AND PRODUCT THUS OBTAINED

BACKGROUND OF THE INVENTION

1. Field of the Invention

This invention relates to a process for obtaining soybean protein flakes and/or granules of agreable taste suitable for the direct human consumption, easily digestible and almost devoided of the flatulence.

2. Description of the Prior Art.

As known, the necessary components of a complete nurishement are the proteins, the lipids and the glucydes.

As to the proteinic influence of a nurishment, the soybean seeds, especially if defatted, allow several advantages.

Consequently, soybean is adopted as a feeding source high in vegetable proteins. However, it is unpleasant to the human palate, so that it cannot because as it is without further handling with other substances and their consequent cooking (in order to get wurstels, hamburgers, biscuits, bread and so on).

This occurs also by using defatted and re-treated soybean meat obtained, through an extrusion process in granular form, which has been always suggested to be used in mixture with other foods which, afterwards are required to be cooked.

Many processes have been suggested for obtaining soybean protein suitable for the direct human consumption without further handlings, either in granular or flour form, or in paste form mixed with oils or fats.

In the process disclosed in the Italian patent application No. 21753A/80 the extruded granules of soybean proteins are subjected to a drying operation (dry cooking) at a temperature or between 60° C. and 120° C. for a period between 14 and 3 hours.

In U.S. Pat. No. 3 865 956 the defatted soybean seeds, with a moisture content lower than 17%, are heated at 150°–35° C. for 2–60 seconds under a pressure of 3–30/kg.cm$^2$ and then rapidly expanded by lowering the pressure. Finally the product obtained is powdered to a particle size of about 200 microns and mixed with oils for obtaining a soybean paste. The process disclosed in the above U.S. patent is a typical extrusion process wherein the product is subjected to a very quick cooking and lightening due to the expansion.

Both these known processes lead to soybean proteins in granular or paste form when mixed with oils, ready to the direct human consumption. In fact, such processes modify the soybean proteins converting them into a product more agreable to the palate which can be eaten without further handling. However, the soybean proteins obtained by these known processes are still hard to digest if not sufficiently cooked. In fact, in both the above known processes the cooking time is not enough to get protein granules which were sufficiently cooked to be easily digestible by feeble or suffering stomachs, especially if directly eaten as such for curative purposes, for relatively long periods of time and not in small dosages.

Also a further prolongued drying, as described in the Patent application No. 21753A/80, does not improve the digestibility, but only improve the taste.

Moreover in the extruded soybean proteins, before and after the drying process, the stachiose and raffinose sugars are still present in high percentage (12 to 14%); these sugars, in fact, are not hydrolized by the two above mentioned heat-processes.

When, on the contrary, such granular soybean proteins are used as such and eaten alone in not small dosages for curative purposes (from 20 to 60 gr. daily) and for periods of a few weeks, the presence of the above sugars lead to flatulence, namely the rising of intestinal gas which is upleasantly ejected, producing considerable troubles to people eating the proteins granules as such. Therefore, the removal of the flatulence is important for a nurishment based on soy proteins to be eaten as such.

Clinical tests have pointed out that flatulence is so notable and so demoralizing, even eating in small quantities soybean proteins, that patients are induced to refuse such nurishment even after few weeks.

Summary of the Invention

The object of this invention is to provide a process permitting the elimination of flatulence of the extruded soybean proteins.

Particularly, the object of this invention is to provide a process for substantially reducing the two sugars, stachiose and raffinose, in the granular extruded soybean proteins, and for obtaining granular extruded soybean proteins easily digestible being light and well cooked.

According to the present invention, this and other objects are achieved by a process consisting of subjecting the extruded soybean protein granules to a puffing-process comprising: cooking the soybean granule proteins with stem under a pressure of between 1 and 7 atm. for a period between 3 and 40 minutes; rapidly increasing the pressure to the end of the cooking, at a value up to 20 atm., and therefore expanding the product by shot, with immediate reduction of pressure.

The cooking of the extruded soybean protein granules is made preferably at a pressure between 1,5 or 3 atm. and for a period from 8 to 15 minutes. The increase of the pressure to enable the "shot" of the product is preferably brought up to 9–15 atm.

The quite long period of the cooking under pressure and in highly moist conditions, (due to the moisture released during the heating), allows the sugars to hydrolize (to become diluted and to dispersed), so that, after the "shot" operation, such sugars are present only in trace amounts.

Soybean proteins are obtained in light and crispy friable flakes which melt in the mouth, and are easily digestible as being well cooked. These soybean proteins are suitable as such for the consumer even for curative purposes; soybean proteins are proved to be suitable as such in particular daily dosages to reduce hypercholesterolaemia.

They keep unaltered the nutritional characteristics of the basic product and surprisingly, even if eaten, in high dosages, they do not lead to flatulence.

The raw material subjected to the puffing system, according to the process of the present invention, is the defatted soybean flour (obtained from soy seeds treated for separating oil), textured and extruded in granular form.

Such raw material shows the following composition percentage:

Proteins (dry solids N=5,25%): about 52%
Moisture: 10–15% about
Fats: 1,5% about
Fibers: 3,5% about Ashes: 6,5 about
Carbohydrates: 26% about
Calories: 280 about Of course, proteins with higher proteic content up to about 90% on dry solids can be used, provided in granular form. Such product as already indicated, are derived from the proteic fraction of the soybean seeds which are wetted and processed at high pressure and for a few instants, at high temperature in order to be extruded.

The defatted textured and extruded soybean granules (proteins) used as raw material in the puffing process of the present invention, are generally irregular in size: about 5% bigger than 5,00 mm.; about 85% between 1,2 and 5 mm; about 7% lower than 0,5 mm.

Bigger or lower sizes can be used of course, even if granules having the size of hazelnuts granules, used to decorate cakes, are preferred. The puffing process, subject matter of the present invention, allows to obtain soybean protein flakes having a specific gravity comprised between 90 and 350 g./lliter, (the specific gravity of the extruded soybean proteins is of 350–400 g./liter).

In order to make the extruded granular proteins well cooked and lightened by "shot", according to the process of this invention, more dainty, that is crispier such proteins are subsequently subjected to a drying process.

Such drying process does not modify their characteristics and their taste, as the puffing process has already made them agreable to the consumption as such, but only to have them crispier, namely more agreable and of long shelf-life.

And drying process and technic can be used, as the purpose is only to dehydrate the extruded and puffed soybean proteins flakes. Drying temperatures varying from 30° C. to 90° and drying times varying from 1 to 10 hours may be used.

After the drying operation, the puffed flakes already dry and crispy (moisture content 0,1–8%) can be sieved in order to separate the powder from the flakes, even if such an operation is not necessarily required.

The soybean protein flakes obtained by the process of the present invention have completely new characteristics, never obtained before, as lightness, crispiness, agreable to eat, which easily melt in the mouth, easily digestible, even by the more delicate stomachs, and maintain completely and unaltered the proteinic contents of the raw product and only traces of the stachiose and raffinose sugars. for the above characteristics the product is fully suitable to be eaten and intaken as it is, having lost the unpleasant taste of the raw product and has gained an agreable taste to be palate the more exigent.

The granular soybean proteins, cooked and lightened, obtained according to the process object of this invention, can be therefore used alone or in mixture with a wide range of foods. Thus, for instance, in order to make such proteins not only more protected against the atmospheric moisture, but also for curative purposes, as well to give them a good lipids content, they can be mixed with a semi-fluid paste of soybean lecithin or an edible fluid oil.

The soybean lecithin used for the preparation of the mixture with the expanded soy proteins, is the commercial type in paste form (containing about the 33% of soybean oil) semi-fluid lightly heated in order to make it more fluid, especially during cold seasons. The mixing operation consists in adding to the expanded soybean protein flakes soybean lecithin, if it is the case, heated at a temperature lower than 100° C. (at 100° C. or over, for a period of 30 minutes, the phospholipids unites of lecithin are destroyed).

The preferred mixing method consists in putting the extruded, puffed and dried soybean protein flakes in a fix drum with rolling blades and, meanwhile the blades are moving, soybean lecithin or fluid oil is dropped in the drum slowly.

Because of the great porosity of the extruded and puffed soybean proteins the percentage of soybean lecithin and/or other lipids which are easily absorbed can be very high, that is from a minimum of 3% to a maximum of 40%, by weight a dosage varying from 10% to 20% by weight is preferable, in order to not compromise the agreable taste of the expanded soybean protein flakes.

The soybean proteins, extruded, puffed and dried, and optionally enriched with soybean lecithin or with another edible oil, can be eaten alone without any further addition to other foods and further cooking, or can be used as such in a very wide range of foods. To the flakes of soybean proteins, light and ready to eat, of the present invention can be added other sweetening or salted ingredients, in order to complete their nutritional power. The added substances must be in fluid or semi-fluid form in order to make easier their absorbtion. If the fluid or semi-fluid form is obtainable by solution in water, than the added substance will be used as syrup. The extruded and puffed soybean proteins during the absorbtion of such syrup become soft and their crispiness. In this case, it is enough to dry them once more in the same conditions above mentioned. If desired, it is possible to add after soybean lecithin or a fluid oil to the dried product.

The puffing process of the present invention is mainly characterized from the fact that: the raw product is "defatted" granular soybean proteins cooked and expanded by extrusion; the cooking time is long enough; and further the puffing is made with the technique of the "shot" after the pressure has been increased at the end of the cooking.

It is considered very surprising that only by subjecting to the puffing process of this invention deffatted soybean seeds, already cooked and expanded by extrusion, it has been possible to obtain light soybean proteins in granular form crispy, of pleasant taste, easily digestible and essentially devoided of sugars, stachiose and raffinose which, it is known, lead to flatulence.

The following examples are given still better to illustrate this invention without being however a limitation thereon.

EXAMPLE 1

A puffing gun is filled with 3–5 Kg. of defatted and extruded soybean granules having the above described size. The cooking starts on direct fire of propane gas (or methane); while the cylinder is rolling for the cooking. The moisture contained in the granules is slowly released and the pressure increases up to 3 atm.

The cooking time is of 8 to 20 minutes, during such time the product is slowly cooked at a pressure of about 3 atm. After the cooking time, operating on the specific valve, the pressure is rapidly increased and, feeding steam, a pressure 9 to 14 atm. is reached. The rolling cylinder is stopped and by using the proper handle the hatch of the gun is open.

With a sharp shot the material is thrown at 6 to 8 meter distance into the collecting chamber. The extruded and puffed soybean granules are collected. They are moist and thready, some times even thick and clotted in threadey batches, because of the moisture they have absorbed before the shot. The granules are spread on a grate and dried at a temperature of about 80°/90° C. For such operation the grate is put in a drier for one/two hours, just to enable to soy protein flakes, thus obtained, to lose great part of the moisture acquired during the puffing with steam.

After drying, the soy protein flakes appear to be light, crispy and devoid of the unpleasant taste of the basic product before the puffing operation, that is, of the extruded soy proteins.

The flakes are subsequently sieved in order to remove the eventual clots formed during the puffing operation.

In the manner also the powder (flour) is removed from the flakes. The material is thus ready to be packed and consumed as such without any further handling, as taste lightness and crispiness make it completely suitable for the direct consumption.

EXAMPLE 2

Example 1 is repeated and the obtained puffed soybean protein flakes are put in a fix cylinder with moving blades (about 5 to 6 blades). While the blades are moving into the cylinder, a percentage of 10% by weight of soy lecithin previously heated in order to make it fluider, is slowly dropped into the cylinder.

After such operation the product can be packed for the sale or for storage.

EXAMPLE 3

Example 2 is repeated and the soybean lecithin is added after the drying stage and before the sieving.

EXAMPLE 4

Example 2 is repeated and a quantity of 20% by weight of soybean lecithin is slowly dropped on soybean protein flakes. Because of the exceptional absorbtion power, due to the lightness achieved by the flakes, even such high dosage of a viscous material, like soybean lecithin, is easily absorbed by the soybean protein flakes. The flakes appear greasy on the surface for some time, but just the day after they have a very good appearance, not all greasy and of agreable taste.

That is of particular importance as, though a high dosage (20%) of a repellent product has been added, like soybean lecithin paste, of commercial type, the obtained soybean protein granules have a good taste, still acceptable; as a matter of fact, after some days of storage the unpleasant taste of soybean lecithin is completely neutralize-d by the agreable taste of the puffed protein flakes.

EXAMPLE 5

Example 2 is repeated by substituting the soybean lecithin with a fluid edible oil such as soybean oil, maize oil, olive oil etc. The product obtained has the same characteristics of the product as per example 2.

EXAMPLE 6

Operating according to example 2, the soybean lecithin is partially or fully replaced with roasted hazelnuts paste is absorbed slowly. Such paste can be also sweetened.

EXAMPLE 7

Operating according to example 2, the soybean lecithin is partially or fully replaced with roasted apricot kernels paste. Such paste can be also sweetened. The taste acquired by the soy protein flakes is typical of the "bitter almonds".

EXAMPLE 8

10 kg of sugar and 10 kg of puffed soybean protein flakes of example 1 are fed to a fixed drum with 5–6 rolling blades duly heated. When sugar melt on direct fire and covers the surface of the flakes, these appear candy, very crispy and have a good taste of candy sugar.

The flakes are cooled on a cooling table always moving in order to avoid clots and then sieve. They are ready for the consumption.

EXAMPLE 9

The soybean protein flakes of example 8, being very hydroscopic because of the presence on the surface of the candy sugar, are put into a drum with rolling and processed with soybean lecithin or with fluid oil, exactly as per example 2. Of course, in this case a good impermeabilization of the sugar is achieved and a good crispiness for long time too. The soybean proteins achieve also a good nutritional power as the final composition is soybean protein, lipids and sugar.

EXAMPLE 10

Each product obtained according to examples 1,2, 8 or 9 is furtherly covered with a light film of chocolate according to the method "wrap-process". At the end the product has a very pleasant chocolate taste, it is very crispy and agreable.

EXAMPLE 11

In order to obtain soybean protein flakes of slightly salted taste to be used for snacks, 200 gr. salt are diluted in 1 liter warm water until complete solution. Such slated water is emulsified by mixing with a part of the soybean lecithin, The procedure of example 2 is followed. The soybean protein flakes acquire an agreable salted taste. By adding to the water solution some flavour (i.e. bacon and so on). Soybean protein flakes having taste and in the meantime a good ham taste or another, according to the flavour added, are obtained.

EXAMPLE 12

Example 1 is repeated. After the drying, without sieving, the puffed lightened soybean protein granules are milled in powder form. A precooked flour is obtained at very high proteic rate, light and agreable (density from 20 to 400 about gr./liter) ready to be used in a wide range of foods and/or dietetic and/or for children foods.

What is claimed is:

1. A process for obtaining a soybean protein product of agreeable taste, easily digestible and producing limited flatulence, consisting essentially of:
    (a) steam-cooking extruded soybean protein granules, at a pressure between 1 and 7 atm. for a period of about between 3 and 40 minutes;
    (b) rapidly increasing the pressure at the end of the cooking step (a) up to a value of 20 atm.; and
    (c) lightening and expanding the cooked product by instantaneously reducing the pressure to atmospheric pressure to obtain a puffed product.
2. The process according to claim 1, wherein the cooking with steam of the soybean protein granules is made at a pressure between 1,5 and 3 atm. and for a period from 8 to 15 minutes.

3. The process according to claim 1 wherein the pressure at the end of the cooking is brought to 9-15 atm.

4. The process according to claim 1, wherein the extruded soybean protein granules cooked and lightened by the puffing process are further subjected to
(d) drying.

5. The process according to claim 4, wherein the drying process of step (d) is carried out at a temperature between 30° C. and 90° C. and for a period of time between 1 and 10 hours.

6. The process according to claim 1, wherein the extruded soybean protein granules cooked and lightened by the puffing process are added to soybean lecithin or to oil in a quantity comprised between 3% and 40% by weight.

7. The process according to claim 6, wherein the soybean lecithin is added in quantity comprised between 10% and 20% by weight.

8. The process according to claim 6, wherein the soybean lecithin has about 33% of oil content and is heated at a temperature lower than 100° C. to increase the fluidity thereof.

9. The process to claim 6, wherein the extruded, cooked and lightened and expanded soybean protein granules to be added to soybean lecithin, are dried.

10. The process according to claim 4 wherein the puffed and dried product obtained from step (d) is admixed with an ingredient selected from the group consisting of lipids, other proteins, sugars, and other sweetening or salting ingredients, alone or in admixture with soybean lecithin or with an edible oil.

11. The process according to claim 1, wherein the obtained soybean protein flakes have a density of about 90 and 350 g./l.

12. The process of claim 1 wherein the soybean protein product is in the form of a powder, or it is in a form capable of being turned into a powder.

13. The process of claim 12 wherein the soybean protein product is milled into a powder.

* * * * *